April 7, 1970 L. R. KELLY, JR., ET AL 3,505,483
PROGRAMMABLE EXTERNAL DIAL OPERATING DEVICE
Filed Feb. 23, 1966
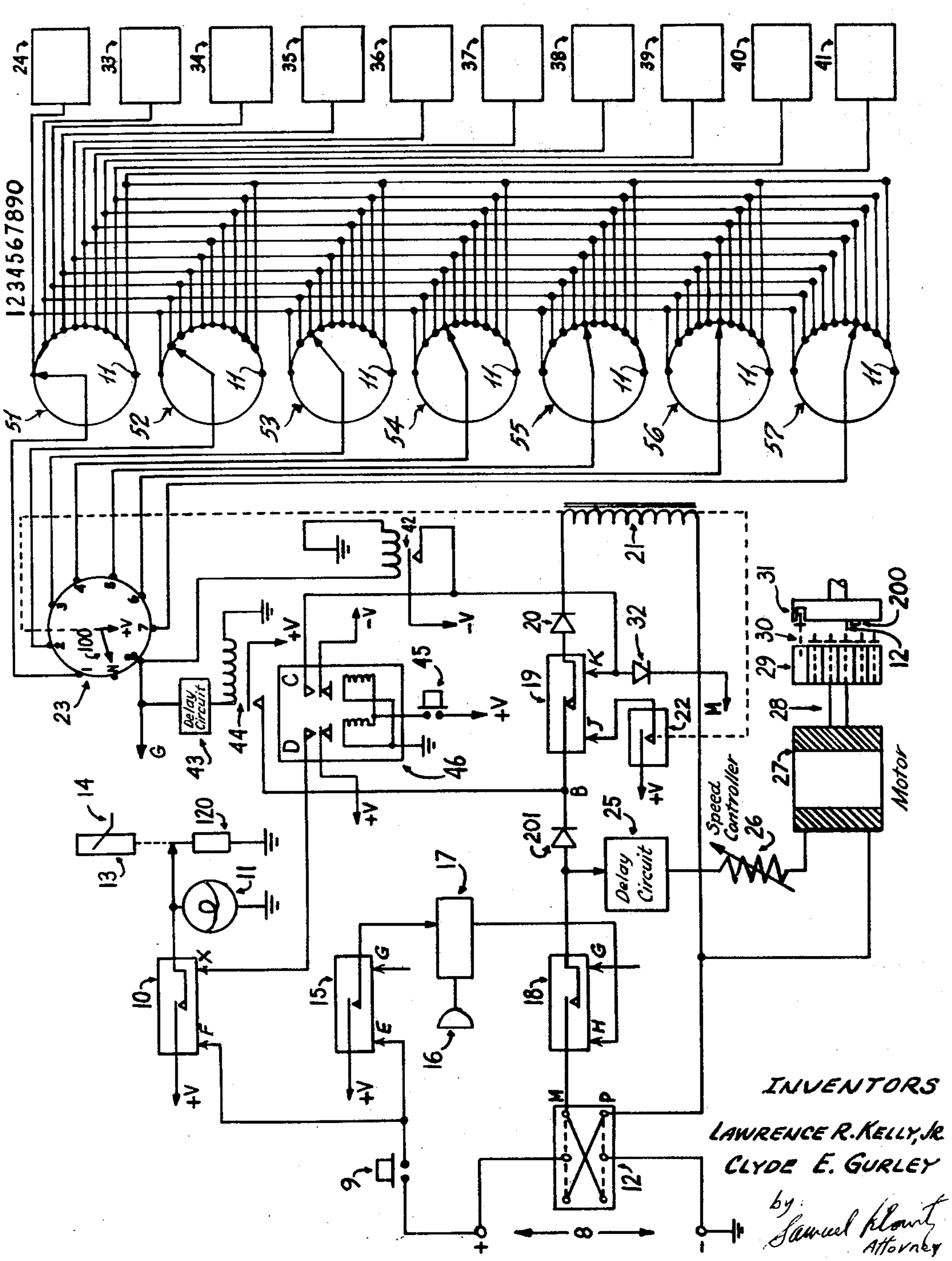
INVENTORS
LAWRENCE R. KELLY, JR.
CLYDE E. GURLEY
by Samuel Kleinrt
Attorney

United States Patent Office 3,505,483
Patented Apr. 7, 1970

3,505,483

PROGRAMMABLE EXTERNAL DIAL OPERATING DEVICE

Lawrence Randolph Kelly, Jr., and Clyde Edward Gurley, Washington, D.C., assignors to Pelass Systems, Inc., Washington, D.C., a corporation of the District of Columbia Filed Feb. 23, 1966, Ser. No. 529,542
Int. Cl. H04m *1/44*
U.S. Cl. 179—90 17 Claims

ABSTRACT OF THE DISCLOSURE

An automatic telephone dialling system which is responsive to the closure of a switch which automatically lifts the telephone instrument for operation, and upon the initiation of a dial tone makes possible the automatic dialling of a pre-set telephone number of any desired party consisting of seven or less digits, for example, the single digit setting identified with the dialling of "OPERATOR."

This invention relates to programmable external lifting automatic sequential selecting systems, and is considered new and unique in its versatility and many potential applications. In brief, the invention permits an individual or device to close a switch and cause the automatic dialing of a telephone number programmed. Memory, by the invention, of the number to be dialed or selected is erased and reprogrammed at the discretion of the programmer.

A principal object of the invention is to provide means for a reliable, convenient, and economical device for automatic dialing of a pre-programmed telephone number with 1 to 7 digits. The principle of operation, however, allows for expansion to any number of digits so desired for automatic dialing and with slight modification can be applied to "Push Button" telephone dialers. Applications of this invention, as the basic part (heart) of a system, are many and varied.

In the drawing:

The drawing shows a schematic diagram of a preferred programmable external lifting automatic sequential selecting system (PELASSS) in accordance with the invention.

In the drawing, solid lines represent electrical paths while dotted lines represent mechanical linkages.

To describe the principle of operation of our invention, it is assumed in the drawing that the numbers programmed for dialing are 123–4567. The sequence of operation, for the programmable external lifting automatic sequential selecting system to accomplish this feat, is as follows:

Non-shorting rotary switches 51, 52, 53, 54, 55, 56 and 57 are manually dialed to the numbers 1, 2, 3, 4, 5, 6, and 7, respectively.

Momentary push button switch 9 is depressed and released. This action simultaneously applies a positive voltage from power suorce 8 (AC to DC power supply, or battery(ies)) to point F (for simplicity, this point represents the set line of the latching relay coil—the other side of the coil is not shown but is understood to come directly from the negative terminal of the power source) of latching relay 10 (SPST—two coil bistable latching relay) and point E of latching relay 15 (same type as relay 10).

Relay 10 switch contact, which is normally open, closes and applies positive voltage to monitor lamp 11 and solenoid 120. Solenoid 120, being energized, is made to force its plunger 13 in a vertical direction. The lift arm 14, connected as shown to plunger 13, physically lifts the telephone receiver off of its hook. The upward stroke of plunger 13 and lift 14 are physically pre-adjusted such that the telephone receiver's dial tone is allowed to register.

Relay 15 switch contact, which is normally open, is closed as results of the described action of momentary switch 9. As result of relay 15's latching, a positive voltage (operating) is applied to a sensitive (low level) signal amplifier 17. The dial tone of the telephone is detected by microphone 16 and fed to amplifier 17 for amplification. The reception of the dial tone was made possible by solenoid 120's plunger 13 and lift arm 14 physically raising the telephone receiver beyond its switched off position.

The positive output voltage of amplifier 17 is fed to coil H of latching relay 18 (main switch). This action sets (closes) latching relay 18's normally open contact allowing positive voltage from 8 through DPDT (12) to point M, to be applied to delay circuit 25 and latching relay 19, whose contact is normally closed. Diode 201 is simply a blocking diode.

Double pole double throw switch 12, which acts as a position limit switch, is assumed to be in the position such that a positive voltage is applied to point M. It is understood that the negative side of the line is taken directly from the negative terminal of power source 8. Similarly, diode 32's cathode is positive and the other side of coil K is connected to the positive side of power source 8.

Positive voltage is therefore passed through diode 201, latching relay 19, and diode 20, and applied to electromechanical stepping switch coil 21. The application of this voltage physically cocks stepping switch 23. Diode 32 blocks positive voltage to coil K of relay 19. Simultaneous with this action, relay 22's contact (mechanically linked with coil 21's action) is physically closed and applies a positive voltage to coil J of latching relay 19. Excitation of coil J causes the normally closed contact of latching relay 19 to open. This action disconnects the positive voltage to coil 21. Disruption of the voltage to coil 21 causes wiper arm 100 of stepping switch 23 to step from its neutral (N) position to position 1.

Position 1 of stepping switch 23 is permanently connected to the selector (main) terminal of rotary switch 51. Positive voltage, connected to wiper arm 100, is thus fed through to solenoid 24 by way of position 1 of rotary switch 51. Solenoid 24 is therefore activated and forces its plunger (spring retained) into the number one (1) hole of the telephone's finger dial unit 31.

Immediately following the closing of the contact of latching relay 18, power (positive voltage) is applied to delay circuit 25. Rheostat 26 serves as the speed controller for DC motor and gear mechanism 27. Milliseconds after the application of power to delay circuit 25 and the activation of solenoid 24 (in this case the same position as the first of the assumed numbers for dialing, that is to say "1") unit 27 starts and physically rotates units 28 (shaft from gearing), 29 (mounting plate containing solenoids 24, 33, 34, 35, 36, 37, 38, 39, 40, 41) and 31 (telephone finger dailing disc) in a clockwise rotation until the mechanical stop 200 is reached whereat is located limit switch 12.

At this very instant (milliseconds before to be exact) the striker of plunger 30 and of solenoid 24, strikes DPDT limit switch 12 thus reversing the power to unit 27 and causing it to return toward its original position in a counterclockwise direction. The cathode of diode 32 becomes negative, with this switching action, thus activating coil K of latching relay 19 to close the contact of latching relay 19.

Upon return of unit 29 back to its original position (all ten solenoids—24, 33, 34, 35, 36, 37, 38, 39, 40, 41 in line with the ten circular holes of the telephone's dialing disc), DPDT limit switch 12 (easy action toggle switch) is knocked back to its original position by a striker lug on unit 29 which moves in a path containing toggle switch 12.

Point M of DPDT 12 again becomes positive (with point P negative) and connects to stepping switch coil 21 through units 18, 201, 19, and 20. This action cocks stepping switch 23 and mechanically closes the contacts of relay 22. The contact of latching relay 19 is opened by application of positive voltage through relay 22 to coil J of relay 19. For reasons of simplifying the drawing, the other side of coil J of relay 19 is not shown and is understood to be connected to the negative terminal of power source 8.

The opening of the contact of relay 19 constitutes a pulse, therefore wiper arm 100 of stepping switch 23 moves to position 2 of switch 23. At this instant, solenoid 24 is deenergized and plunger 30 is retracted from dial position number "1" and solenoid 33 becomes energized and causes its plunger to position into dial position number "2" of unit 31. It should be recalled that the number "programmed" and assumed for automatic dialing is "123–4567" and that the commencing of dialing is subject to reception of the dial tone. The second digit, "2" of this assumed number is ready for dialing.

Slightly delayed in time with respect to the activation of solenoid 33, motor-gear mechanism 27 and shaft 28 rotates units 29 and 31 in a clockwise rotation until the striker on the plunger of solenoid 33 strikes limit switch 12 (action adjusted to be in coincidence with stopping action of the telephone's mechanical stop 200). DPDT switch 12 flips and places point M at a negative potential. At the same time the contact of relay 19 closes as results of coil K being activated through point M of diode 32 going negative.

Units 27 and 28 rotates units 29 and 31 counterclockwise and back to the original position. When switch 12 is actuated by the striker lug on unit 29, point M again becomes positive. Diode 32 blocks this voltage from coil K of relay 19, thus allowing contact of relay 19 to remain closed. The positive voltage passes through relays 18, 19 and diodes 201 and 20 to coil 21 and cocks stepper switch 23. Relay 22's contact is caused to close and activate coil J of relay 19 thus causing relay 19 contact to open. This constitutes a pulse thus causing wiper arm 100 of stepper switch 23 to step to position 3. This action deactivates solenoid 33.

Wiper arm 100 of switch 23, being connected to solenoid 34 through position 3 of rotary switch 3, energizes solenoid 34. Units 27 and 28, delayed in time to allow solenoid 34's plunger to insert itself into hole 3 (DEF) of unit 31, rotates 29 and 31 clockwise until striker of solenoid 34 strikes limit switch 12. Point M becomes negative and to the contact of relay 19 closes. Upon return of unit 29 and 31 to its original position, the striker lug knocks limit switch 12 to its original position.

The automatic dialing of digits "4" (GHI), "5" (LKJ), "6" (MNO), and "7" (PRS) are carried out in the same manner as that described for digits "1," "2," (ABC) and "3" (DEF).

Routine sequence of operation changes when dialing action is completed for digit "7" (PRS), the last digit of the number assumed for dialing. When the striker lug strikes switch 12 back to its original position, point M becomes positive, switch 23 cocks, coil 21 is energized and switch 22 is mechanically closed, thus causing relay 19's contact to open. This constitutes a pulse and causes wiper arm 100 of switch 23 to step to position 8. Solenoid 38 is de-energized and its plunger with its striker is retracted out of unit 31.

Position 8 of switch 23 applies a reset voltage (positive) to coil G of relay 15 and coil G of relay 18. This action places relays 15 and 18 back into their normally open position.

By relay 18's contact opening, power to motor and gearing unit 27 is cut off immediately. Because of delay circuit 25 filtering out positive voltage, applied between the time point M becomes positive and relay 18's contact opens, units 29 and 31 remain lined up in their normal and original resting (dialing) position.

Also upon reaching position 8 of switch 23, relay 42 picks up (closes its contact) and applies a negative voltage directly to coil K of relay 19, thus closing the contact of relay 19. This action is necessary because the contact of relay 19 was not closed since dialing operations terminated with digit "7" and point M did not become negative again.

Delayed in time from the action of relay 42, relay 44 is activated through delayed action of delay circuit 43. When relay 19's contact is closed, a positive voltage is fed through relay 44 to point B and through relay 19 (contact now closed) and diode 20 to stepper coil 21. This action cocks switch 23 and mechanically closes relay 22. Coil J of relay 19 is activated, opening contact of relay 19 thus constituting a pulse.

Wiper arm 100 of switch 23 rotates to the neutral position on which nothing has been placed.

This completes the automatic dialing of the assumed telephone number. To reset relay 10 back to its normally open position and close contact of relay 19 back to its normally closed position, momentary switch 45 is depressed.

Once latching relay 10's coil X is activated, the positive voltage is disconnected from lamp 11 and solenoid 120. Thus, the telephone receiver falls back to its resting position terminating all communications.

To go through the sequence of dialing any combination of seven (7) digits, one merely sets rotary switch 51 to the digit of the first number he wishes to dial; and program the second, third, fourth, fifth, sixth, and seventh rotary switches to correspond to the second, third, fourth, fifth, sixth and seventh digits of the telephone number. Subsequent to "programming" the numbers, by pressing momentary switch 9, the dialing of the desired telephone number is accomplished automatically.

The versatility of the "programmable external lifting automatic sequential selecting system" is further delineated by explanations of the dialing of "Information" (411) and of "Operator" (0). The telephone number for information in the Washington, D.C. area is 411.

To automatically dial "411," rotary switches 55, 56 and 57, are programmed (manually set) to the numbers 4, 1, and 1, respectively. Rotary switches 54, 53, 52, 51 are switched to position 11 on the respective switches. By depressing momentary switch 9, solenoid 120 is activated and causes the phone receiver to be physically raised to obtain the dial tone. Microphone 16 picks up the dial tone and amplifier 17 amplifies it and causes relay 18's contact to latch (close).

The latching of relay 18 allows the positive voltage at point M (DPDT limit switch 12 is in the original position which permits point M to be positive) to feed through relay 19 and diodes 201 and 20 to stepper coil 21. Stepping switch 23 cocks, relay 22's contact is mechanically closed and relay 19 (contact normally closed) opens thus constituting a pulse. As a result of this wiper arm 100 of switch 23 steps off of the neutral position to position 1. Position 1 of switch 23 is connected to rotary switch 51. However, since rotary switch 51 is programmed to position 11, none of the solenoids is activated.

Unit 27 (motor and gear mechanism) therefore rotates unit 29 clockwise towards mechanical stop 200 until the striker lug on unit 29 knocks limit switch 12 to its other position such that point M becomes negative. It is important to note that no solenoid has been activated during this time. Upon the actuation of switch 12, relay 19 contact closes.

After return to the original position unit 27, 28, and 29 go through the same aforementioned sequence of operation at the end of which the striker lug actuates switch 12 to its original position to make terminal M positive. Note that this would be the beginning in the dialing of the second digit of a Seven Digit Telephone Number.

No solenoids are activated until the beginning of the fifth sequence at which time solenoid 35 is activated and inserts its plunger into the finger hole (4 which is the same as letters GHI) of unit 31. At the beginning of the next sequence solenoid 24 is activated and in conjunction with units 27, 28, 29, 31, causes the digit "1" to be automatically dialed. Similarly, the last digit "1" is dialed. This completes the dialing of the number "411" or "Information." Wiper arm 100 is returned back to the neutral position in the same fashion as explained under the dialing of a seven digit number. Similarly, the pressing of momentary switch 45 causes solenoid 120 to deactivate and thus physically returns the telephone receiver back to its hook (normal resting position).

To dial "Operator" (0), six 51, 52, 53, 54, 55, 56 of the rotary switches are programmed (set) to position 11 (no action position). It is important to note, however, that only rotary switch 7's switch position 10 is connected to a solenoid. This solenoid is 41 and corresponds to the number "0."

After the depression of momentary switch 9, six complete sequences of operations takes place before a solenoid is activated. On the beginning of the seventh sequence, solenoid 41 is activated and causes its plunger to insert into finger hole "0" of unit 31. Subsequent to the dialing of this number, wiper arm 100 of switch 23 is eventually returned to the neutral (N) position. Depressing of momentary switch 45 completes manual reset and terminates the last event that places the "programmable external lifting automatic sequential selecting system" into its Ready State for Operation.

It should be noted that unit 27 is adjusted such that its operational speed is compatible with a nominal speed for manually dialing a telephone.

Again, it is noted that through minor modifications the invention is readily adaptable to selector type systems (for example, push button telephones). The solenoids 24, 33, 34, 35, 36, 37, 38, 39, 40, and 41) are mounted stationary to coincide with the proper selector positions consisting of the telephone buttons. A disc, with a section removed or a lever for switching polarity switch 12 is attached to the gear and motor unit 27. Note that in this scheme no rotation of solenoids will occur. Since the dialling impulses are transmitted upon the depression of a button by the plunger of the solenoid rather than during the return movement of the dialling disc, the disc and the solenoid mounting bracket replaces unit 29. Switch 12 is so mounted that it is manipulated by the disc or lever arm and retains its primary described function.

It is important to note that FIGURE 1 is the preferred scheme only from a cost and simplicity of construction aspect. Electronic circuits were first considered and used as the preferred circuit, however, it was realized that the assets of speed and size, afforded by electronics, are not required. The development of electronic circuits to perform the same functions as the electro-mechanical devices (latching relays, mechanical stepping switch, etc.) was therefore considered unwarranted. For example, the logical set-reset flip-flop can be used in place of the latching relay; however, the flip-flop is a more complicated and costly device. The micro-second response times of flip-flops are not required in our invention. The invention involves millisecond response times and the state-of-the-art latching relays are perfectly capable of these response times. If use of smaller components becomes necessary, then micro-electronics or integrated circuits can be employed, but at an added cost.

It is recognized that the function of the mechanical stepping switch, in this invention, can be performed electronically by a "Ring Counter" or a "Four Stage Binary to Decimal Counter" (with associated diode matrixes). However, the tradeoff here would be speed and size for low cost. As mentioned before, high speed circuits are not required and size is not considered an important factor. It is further recognized that standard general purpose multipole, multiposition relays with associated latching circuit may be substituted for the latching relays.

It will be apparent that the embodiment delineated herein is only exemplary and that various modifications can be made in construction and arrangement within the scope of the invention as defined in the appended claims.

We claim as our invention:

1. A telephone communication system for automatically dialling any desired pre-settable telephone number in response to the occurrence of a predetermined event, comprising (a) a circuit-closer connecter to a direct-current electrical energy source, adapted to be closed upon the occurrence of the predetermined event.

(b) means operated in response to the closure of said circuit-closer for mechanically lifting a telephone instrument from its support to condition the telephone line for intelligence transmission and the initiation of a dial-tone in the receiver of said instrument, (c) a plurality of electrical solenoids and energizing coils therefor overlying each of the dialling positions of the telephone instrument, (d) pulse generating means actuated by said dial tone for producing a plurality of pulses of at least as great in number as the total number of digits of the pre-settable telephone number, (e) a stepping switch having a number of stations at least as great as the number of digits in said last-mentioned telephone number, (f) means for operating said stepping switch successively by said plurality of pulses, (g) a plurality of adjustable electrical switches with connections extending therefrom in circuit with said stepping switch and each solenoid-energizing coil, adapted to actuate an individual solenoid at each successive station of the stepping switch for the transmisison of the dialling impulses over the telephone line in response to the completion of a circuit from the stepping switch to a specific energizing coil as determined by the pre-set dialling digit on one of said adjustable switches in the sequence of the digits being dialled, and (h) means comprising a terminal contact at said stepping switch for re-setting the system to its original position.

2. An apparatus as set forth in claim 1, wherein at least some of said adjustable switches include an idle terminal having no connection with a solenoid energizing coil so that the stepping switch is adapted to execute its movements through the stations thereof while selectively avoiding the actuation of solenoids in the dialling sequence.

3. An apparatus as set forth in claim 1, including a pick-up device in proximiity to the receiver of the telephone instrument, and an amplifier for the dial tone issuing therefrom.

4. An apparatus as set forth in claim 3, including control means adapted to be energized by said amplified dial tone energy, comprising a magnetic relay and a main switch controlled by said relay for completing an electrical circuit from the direct-current electrical energy source to said pulse generating means, with a reversible direct-current motor in shunt to the latter.

5. An apparatus as set forth in claim 4, wherein said pulse-generating means comprises (a) a coil winding for said stepping switch, (b) mechanical means for physically cocking said stepping switch for an increment of movement in response to the energization of said coil winding, (c) an auxiliary magnetic relay comprising a normally closed switch in circuit with said coil winding, and (d) auxiliary mechanical means responsive to the energization of said coil winding for actuating said auxiliary magnetic relay to effect the opening of said last-mentioned switch and thereby to de-energize said coil winding, thereby to produce one of said generated pulses which permits said stepping switch to complete the increment of movement for which it has been cocked.

6. An apparatus as set forth in claim 5, including an adjustable resistor in series with said reversible direct-current motor to adjust the operating speed thereof.

7. An apparatus as set forth in claim 5, including a delay circuit in series with said motor to interpose a short time-delay in the forward operation of the motor relative to the energization of the electric solenoids.

8. An apparatus as set forth in claim 5, including a double-pole double-throw electrical switch in circuit with said direct current electrical energy source for reversing the polarity of said source to said motor and to said pulse generating means for the generation of said successive energy pulses.

9. An apparatus as set forth in claim 8, including a secondary winding in said auxiliary magnetic relay adapted to be energized by the reversal of the polarity from said source to said pulse generating means for re-closing the switch in said last-mentioned relay.

10. An apparatus as set forth in claim 8, wherein the means for effecting the transmission of the dialling impulses over the telephone line comprises (a) a support for said electric solenoids with plungers therein adapted to be driven by said motor, (b) a rotary dialling disc on the telephone instrument provided with a plurality of circular openings therein below said electric solenoids adapted to have one of the plungers engage the opening therebelow in response to the energization of the coil appurtenant to said solenoid, said dialling disc adapted to be entrained by the plunger of said solenoid in a clockwise rotary direction in conformity with the forward movement of said motor, (c) a mechanical stop on said telephone instrument for arresting the clockwise movement of said rotary dialling disc, and (d) said double-pole double-throw switch being positioned adjacent to said mechanical stop and having an operating lever therefor in the path of the plunger of the energized solenoid to effect the throw of the lever in the reverse direction at the conclusion of the forward movement of the dialling disc.

11. An apparatus as set forth in claim 10, including a striker lug mounted on said rotary solenoid support adjacent to said mechanical stop in the idle position thereof, to actuate said operating lever for said switch at the conclusion of the return movement of said dialling disc to re-set the switch for the operation of the motor in a forward direction and the generation of the next successive energy pulse for advancing the stepping switch to its next station, deenergizing the solenoid which has completed its controlling movement, and energizing the solenoid which is connected to said next station of said stepping switch.

12. An apparatus as set forth in claim 10, wherein said striker lug on said rotary solenoid support complements the idle terminals on said adjustable switches which setting causes no energization of any solenoid, whereupon said lug actuates said operating lever for said switch into one position at the conclusion of the forward movement of the support and throws back said operating lever to its original position at the conclusion of the reverse movement of the support.

13. An apparatus as set forth in claim 8, wherein the means for effecting the transmission of the dialling impulses over the telephone line, comprises (a) a support for said electric solenoids with plungers therein overlying a plurality of push-buttons arranged in a predetermined pattern on the telephone instrument and adapted to be depressed successively by the movable plungers of the solenoids, (b) an auxiliary support for said double-pole double-throw switch, and (c) means for activating said switch between its two alternative positions connected to and driven by said motor.

14. An apparatus as set forth in claim 13, wherein said last-mentioned means comprises a disc plate driven by said motor having a radial sector excised therefrom, and an operating lever for said switch disposed within said sector adapted to be thrown to its alternate positions by the opposite edges of said excised sector as the motor rotates in opposite directions.

15. A telephone communication system for automatically dialling any desired pre-settable telephone number in response to the occurrence of a predetermined event, comprising (a) a circuit-closer connected to an electrical energy source, adapted to be closed upon the occurrence of the predetermined event, (b) a solenoid operated in response to the closure of said circuit-closer for mechanically lifting the telephone instrument from its support to condition the telephone line for intelligence transmission and the initiation of a dial tone in the receiver of said instrument, (c) control means derived from said audible dial tone energy for producing a plurality of successive energy pulses, (d) a stepping switch operated by said energy pulses having a plurality of contacts of at least the number of digits required to dial the number of a called party, (e) a plurality of adjustable switches of at least a number corresponding to the number of digits in the number to be dialled, and adapted to be pre-set to any desired number to be called, each adjustable switch having a movable armature connected to one of the contacts of said stepping switch in the succession of the digits of the number being called and in the order of the successive movement of said stepping switch over said plurality of contacts from a neutral position, and each adjustable switch also having at least a plurality of terminals, adapted for selective contact with said armature, corresponding in number to the dialling positions of the telephone instrument, (f) a plurality of electrical solenoids having movable plungers and energizing coils therefor, overlying each of the dialling positions of the telephone instrument to initiate automatically the required dialling operation, each of said coils being connected to a corresponding terminal of each of said pre-set adjustable switches, and adapted to be energized upon the coincidence of the set position on the latter with the sequential position of the stepping switch corresponding to the position of the desired digit in the group of digits constituting the called number, (g) means for completing the required dialling operation at each successive contact station of said stepping switch and advancing said switch to the next successive contact thereof, and (h) means comprising a terminal contact at said stepping switch for re-setting the system to its original idle position.

16. An apparatus as set forth in claim 15, wherein at least some of said adjustable switches include an idle terminal in addition to the plurality of terminals corresponding to the number of dialling positions of the telephone instrument to enable the successive cycling of said stepping switch without energization of the selective electrical solenoids.

17. An apparatus as set forth in claim 16, wherein the setting of the movable armature on any predetermined adjustable switch to its idle terminal, effects a movement of the stepping switch to its next successive contact without the transmission of any dialling impulses on the telephone line in the course of the dialling operation appurtenant to said predetermined adjustable switch.

References Cited

UNITED STATES PATENTS

| | | | |
|---|---|---|---|
| 2,674,658 | 4/1954 | West ---------------- | 179—90 |
| 3,062,920 | 11/1962 | Sohacki -------------- | 179—90 |
| 3,118,020 | 1/1964 | Andrews ------------- | 179—90 |
| 3,268,670 | 8/1966 | Shadrick ------------- | 179—90 |
| 2,742,971 | 4/1956 | Holmes -------------- | 179—90 |

WILLIAM C. COOPER, Primary Examiner

B. P. SMITH, Assistant Examiner